United States Patent
Akuoku

(10) Patent No.: US 9,697,721 B1
(45) Date of Patent: Jul. 4, 2017

(54) SYSTEMS, METHODS, COMPONENTS, AND SOFTWARE FOR DETECTION AND/OR DISPLAY OF REAR SECURITY THREATS

(71) Applicant: Samuel Akuoku, Old Westbury, NY (US)

(72) Inventor: Samuel Akuoku, Old Westbury, NY (US)

( * ) Notice: Subject to any disclaimer, the term of this patent is extended or adjusted under 35 U.S.C. 154(b) by 0 days.

(21) Appl. No.: 15/205,419

(22) Filed: Jul. 8, 2016

(51) Int. Cl.
| | |
|---|---|
| G08B 1/08 | (2006.01) |
| G08B 25/01 | (2006.01) |
| G08B 21/02 | (2006.01) |
| G08B 15/00 | (2006.01) |
| H04M 1/725 | (2006.01) |
| G08B 13/196 | (2006.01) |
| G08B 13/14 | (2006.01) |

(52) U.S. Cl.
CPC ....... *G08B 25/016* (2013.01); *G08B 13/1436* (2013.01); *G08B 13/19621* (2013.01); *G08B 15/00* (2013.01); *G08B 21/0297* (2013.01); *H04M 1/72538* (2013.01)

(58) Field of Classification Search
CPC .............. G08B 25/016; G08B 13/1436; G08B 13/19621; F41H 9/10; H04M 1/72538; H04M 2250/10
USPC ........ 340/539.11; 348/158; 455/404.1, 404.2
See application file for complete search history.

(56) References Cited

U.S. PATENT DOCUMENTS

| | | | | |
|---|---|---|---|---|
| 8,531,526 | B1 * | 9/2013 | Spence ............ | G08B 13/19621 348/158 |
| 9,443,415 | B2 * | 9/2016 | Nepo ................... | G08B 25/016 |
| 2002/0057915 | A1 * | 5/2002 | Mann ...................... | E03C 1/057 396/661 |
| 2008/0064339 | A1 * | 3/2008 | Cavalier ........... | H04M 1/72538 455/404.2 |
| 2013/0040596 | A1 * | 2/2013 | Paim ...................... | H04W 4/22 455/404.1 |
| 2013/0257612 | A1 * | 10/2013 | Finet .................... | G08B 25/016 340/539.11 |
| 2014/0145847 | A1 * | 5/2014 | Jenkins .............. | G08B 13/1427 340/572.1 |
| 2015/0269835 | A1 * | 9/2015 | Benoit ................. | G08B 25/016 340/539.13 |
| 2016/0192164 | A1 * | 6/2016 | Scully .................... | H04W 4/22 455/404.2 |

\* cited by examiner

*Primary Examiner* — John A Tweel, Jr.
(74) *Attorney, Agent, or Firm* — Fantastic IP Consulting; Eduardo E. Drake

(57) ABSTRACT

Across the planet, the fear of physical attacks is experienced daily by millions of men and women, especially those walking or running alone in secluded areas. In many instances, attacks start from behind, exploiting a weakness in our forward-facing vision system. To address this, the present inventor devised, among other things, a rear-facing clip-on sensor that attaches to the back of a user, detecting rear-approaching objects or persons, and vibrating or beeping to alert the user. In some embodiments, the clip-on sensor includes a digital camera and a wireless transceiver to communicate with a smartphone or smartwatch, not only allowing the smartphone or smartwatch to alert the user via audible, visible, and/or tactile (haptic) alarms, but also to send SOS signals and real-time audio and/or video signals to designated persons or security services.

24 Claims, 5 Drawing Sheets

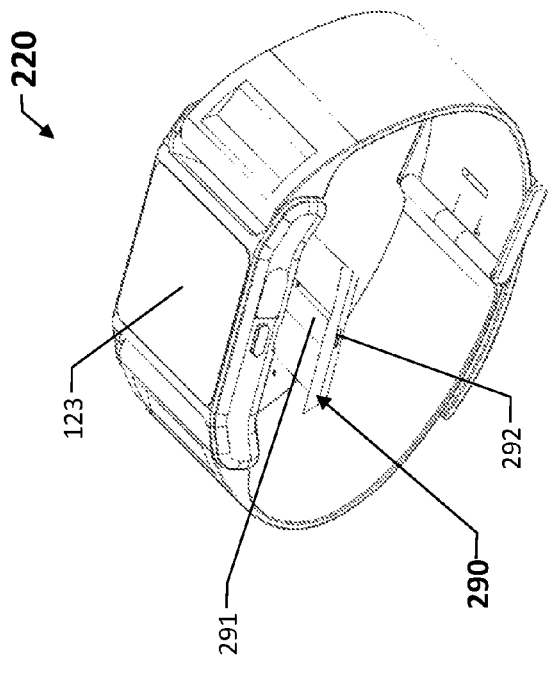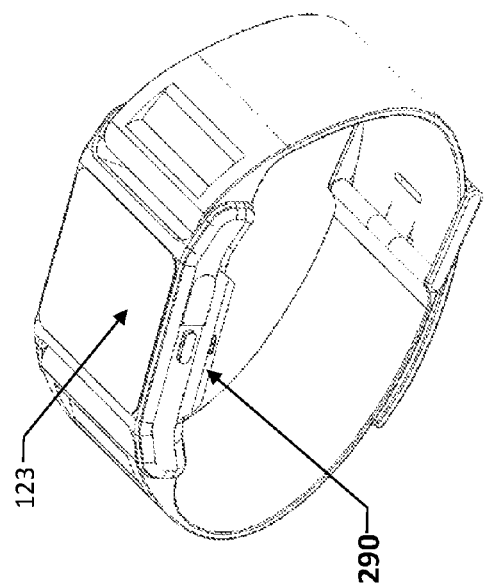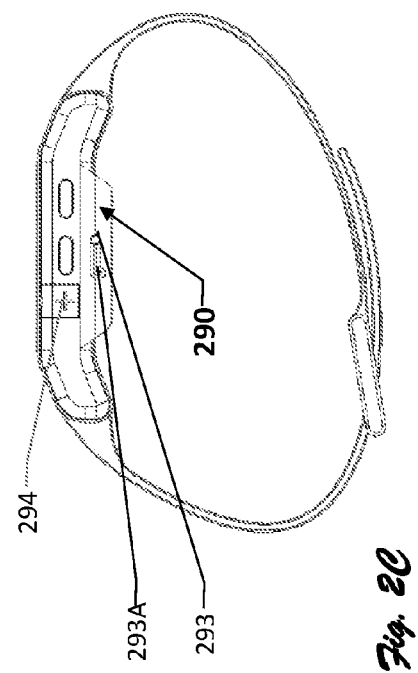

SYSTEMS, METHODS, COMPONENTS, AND SOFTWARE FOR DETECTION AND/OR DISPLAY OF REAR SECURITY THREATS

RELATED APPLICATIONS

The present application claims priority to U.S. Non-Provisional patent application Ser. No. 14/925,938 which was filed on Oct. 28, 2015, and which claims priority to U.S. Provisional Patent Applications 62/069,350 filed Oct. 28, 2014 and 62/091,430 filed Dec. 12, 2014. All of these applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2014, SAMUEL AKUOKU, M.D.

TECHNICAL FIELD

Various embodiments of the invention relate generally to personal security, particularly to systems, devices, methods, components, and software for detecting, indicating, and/or displaying rear-approaching physical threats.

BACKGROUND

Personal safety is one of the most fundamental human needs. Across the planet, millions have experienced violations of this basic human right through physical assaults of various kinds. Fear of such attacks is experienced by both men and women, especially those walking or running alone. In many instances, attacks were initiated from behind, exploiting the fact that our forward-facing eyes require turning our head to see behind and that our attention is on the path ahead or elsewhere.

The present inventor has recognized that existing solutions for identifying rear-approaching physical threats to personal safety while running or walking suffer from one or more shortcomings. For example, use of rear-view mirrors can be effective, but requires use of eyeglasses or other headgear that can be uncomfortable or inappropriate. Also, mirrors require users to put regular visual attention on looking away from their forward direction, even when there is no potential threat present, potentially distracting users from hazards in front of them.

Accordingly, the inventor has recognized a need for better ways of identifying potential rear-approaching threats to personal safety.

SUMMARY

To address one or more of these and/or other problems, the present inventor devised, among other things, one or more exemplary systems, methods, devices, components, and software for detecting and/or displaying rear security threats to individuals. One exemplary embodiment takes the form of a clip-on sensor which detects approaching or closing objects or persons and vibrates or beeps to alert the user. Also in some embodiments, the clip-on sensor incorporates a digital camera and a wireless transceiver to communicate with a smartphone or smartwatch (for example via Bluetooth signals), not only allowing the smartphone or smartwatch to alert the user via audible, visible, and/or tactile (haptic) indicators, but also to enter an alert mode for sending SOS signals and real-time video signals to designated persons or services. In some embodiments, the smartwatch includes an accelerometer or tilt sensor, enabling remote activation of the clip-on sensor to transmit digital images and/or video to the smartwatch via an arm-raising or hand-shaking action. Still other embodiments include a defense capability, such as a blinding strobe light, shrieking alarm, and/or pepper spray dispenser on the smartwatch or the clip-on sensor. Some embodiments allow mounting of the sensor unit on walls, furniture, or other objects remote from the user.

Another embodiment takes the form of a native or aftermarket security app for a smartphone or tablet computer, which uses the front and/or back cameras on the phone as security sensors when not in normal use. For example, a user may be using a non-camera function or app on the smartphone (for example phone, text, email, or browser or game, or video), and the security app, if active, will activate the front and/or back phone cameras (based, for example, on stored user preference information) and monitor the front and/or back camera signals, alerting the users to changes in front and/or back imagery, such as an approaching object or person. In some embodiments, the alert may take the form of a tactile vibration, a sound, and/or a visible indicator, such as pop-up display of a small video window showing the real-time output of the front or back camera responsible for the alert condition.

BRIEF DESCRIPTION OF DRAWINGS

Various embodiments are described herein with reference to the following attached figures (Figs). These figures are annotated with reference numbers for various features and components, and these numbers are used in the following description as a teaching aid, with like numbers referring to the same or similar features and components.

FIGS. 2A, 2B, and 2C are respective left and right perspective and side views of a wrist-mountable base module 220 which may be used in place of the base module in the FIG. 1 system and which therefore corresponds to one or more embodiments of the present invention.

DESCRIPTION OF EXEMPLARY EMBODIMENTS

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

Figure 1:
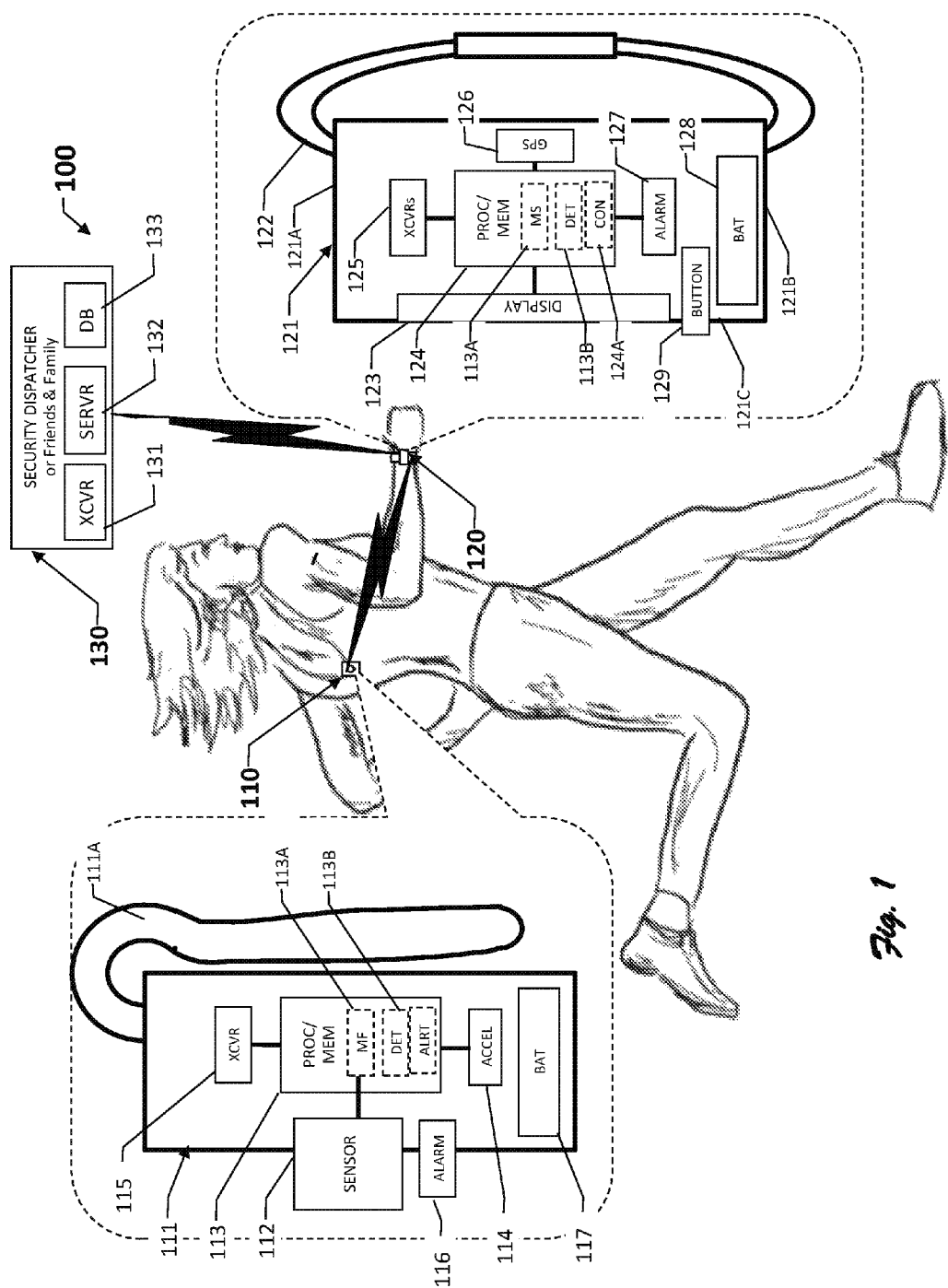
FIG. 1 is a block diagram of a wearable personal security system 100, which corresponds to one or more embodiments of the present invention.

FIG. 1 shows an exemplary wearable personal security system 100 configured to be worn by a man or woman, while running, cycling, or walking. System 100 includes a clip-on rear-threat sensor module 110, a wrist- or arm-mounted base module 120, and a security dispatcher subsystem 130. In general operation, rear-threat sensing module 110 monitors the rear area behind the user for rear-approaching persons or objects. Upon detection of a rear-approaching person or other object, the sensing module communicates or issues an alert signal for example an audible tone or beeps and/or a haptic vibration perceivable via the user. In some embodiments, the sensor module sends an alert and/or image signals, for example by a hardwire or wireless connection, to base module 120.

Base module 120 issues an audible, visible, and/or haptic signal generators, alerting the user of the detection and displaying images or video for viewing. The alerted user can then view the images, and if he or she deems the approaching person or object an actual threat, the user may transmit an alarm signal that identifies the user and includes time, location, and image data to security dispatcher 130. In some embodiments, an alarm unit within the sensor module is also activated, providing a photographic flash and/or audible signal. In some embodiments, the sensor module can also dispense smoke screen and/or pepper spray or other defensive agents.

More specifically, clip-on rear-threat sensor module 110 incudes a housing 111, sensor module 112, a processor-memory module 113, an accelerometer 114, a wireless transceiver 115, an alarm module 116, and one or more rechargeable batteries 117. Housing 111, at least partially machined, molded, or additively-manufactured from a thermo elastic polymer or other material, includes a clip portion 111A, which enables clipping or securing sensor module 110 to a piece of clothing, such as the shirt or jacket or even a waist or headband. In some embodiments, the clip takes the form of a spring loaded alligator clip, or of a combination of a magnet and steel back plate. Housing 111 at least partially contains sensor 112.

In the exemplary embodiment sensor module 112 includes one or more a N×M CCD (charged coupled device) or CMOS (complementary metal-oxide-semiconductor) imaging arrays, ultrasonic transducers, and/or microphones. In some embodiments, one or more of the imaging arrays senses infrared light. Humans typically have a skin temperature of about 93 degrees F., and thus radiate infrared energy with a wavelength between 9 and 10 micrometers. Therefore, the sensor module may include filters tuned 8 to 14 micrometers. Image data from two points in time, for example, 1, 2, 3, 4, 5, 6, 7, 8, 9, or 10 seconds apart, are then compared to determine if there is at least one hot spot that has grown larger or dilated to suggest an approach. Persistent growth or dilation of the hot spot over a threshold number of image frames, for example 3-10, dependent on the imaging rate (frames per second) and/or the rate of movement of the user, can be taken as indicative of an approaching or closing object. For example, some embodiments determine whether a detected hot spot has grown at least 50% in overall surface area or number of pixels over 5, 10, 20, or 50 successive frames, suggesting that the object is approaching. The machine-executable instructions for processing the images to make this determination are, in some embodiments, stored in processor-memory module 113.

In some embodiments, one or more pyroelectric infrared sensors are used, each comprising a crystalline material that generates a surface electric charge when exposed to heat in the form of infrared radiation. When the amount of radiation striking the crystal changes, the amount of charge also changes and can then be measured with a FET (field-effect transistor) built into the sensor. The sensor elements are sensitive to radiation over a wide range so a filter window is added to the sensor circuitry to limit detectable radiation to the 8 to 14 micrometer range. It is expected that an approaching object, such as a human, will cause an increase in output of intensity of the sensor over time. Thus, the sensor module circuitry itself or the processor may compare sensed intensity at two points in time, a former and a latter one, to each other. If the latter is larger, it suggests an approaching or closing object. A third intensity measurement greater than the second also suggests continued approach. Some embodiments may detect and differentiate human and non-human approaching objects and provide different alert signals.

Some embodiments augment or replace one or more of the imaging arrays with an ultrasonic range finder circuitry that sends out ultrasonic sound waves in the frequency range of 20 KHz or greater, detect echoes of the sound waves from an object back to the sensor, and determine a distance of the object from the sensor module (user). If the sensed echo occurs within a proper time window indicative of an object being within a threshold distance from the user, for example 10, 20, 30, 40, 50, 75, or 100 feet, the system registers a first detection event, which in some embodiments may result in an alert signal being issued. However, some embodiments register the first distance and monitor for a second detection event of the object at a shorter second distance than the first, for example 10, 20, or 30 percent shorter. If the second detection event occurs, it is taken to indicate a closing object. Some embodiments use both infrared sensing and ultrasonic ranging to determine closing rate of warm objects. Other embodiments may also use form recognition with full color or gray-scale imaging arrays to identify humans within image frames and track the size of the humans across multiple frames, as in the case of the infrared hot spots. Sensor module 112 provides output signals in the form of a detection signal, range data, audio, and/or image data to processor-memory module 113.

Processor-memory module 113 includes processing and memory circuitry for storing and executing machine-executable instructions that govern receiving and processing of the output data and/or event detection signals from sensor module 112. The memory also stores machine executable instructions and/or other parametric data, such as thresholds, for governing the sensitivity and/or operation of other portions of module 110. For example, module 113, in some embodiments, includes a motion filter module 113A, which includes machine executable instructions responsive to accelerometer 114, to filter out motion, for example time-averaged motion of the user in one, two, or three dimensions, from the image data of sensor 112 prior to providing data to detection module 113B. Detection module 113B includes machine executable instructions for determining whether the data over a predetermined time period, for example 5, 10, 15, 20 seconds is indicative of a rear-approaching human or other object. If the determination is affirmative, alert module 113C, which includes suitable machine executable instructions, causes transceiver module 115 to communicate with wrist-mounted base module 120. In some embodiments, sensor module includes alarm module 116, enabling the sensor module to be used potentially as a standalone device without base module 120. For example, alarm module 116 may include an audible tone generator and/or haptic vibrator to alert the user of a detected approaching object. In some embodiments, alarm module 116 may also include a defense capability, such as a blinding strobe light, shrieking alarm, and/or pepper spray dispenser on the smartwatch or the clip-on sensor.

Base module 120 includes a watch housing 121, an adjustable wrist-band 122, a display 123, a processor-memory 124, a transceiver module 125, GPS circuitry 126, an alarm module 127, and a battery module 128. More particularly, watch housing 121, which can take any number of desirable forms, such as rectangular, circular, or elliptical, includes end regions 121A and 121B, which are coupled to adjustable wrist-band 122, and a face region 121C which includes electronic display 123. Within housing 121, which is generally waterproof or water-resistant, there is processor-memory module 125.

Processor-memory module 124 includes processing circuit and memory, with the memory storing machine executable instructions and related parameters such as alert timing thresholds. Processor-memory module 124 includes control module 124A, which includes machine executable instructions and related parameters, for controlling the response of the base module to detected events. In one embodiment, the control module orchestrates a series of actions in response to a detected approaching threat event sensed or detected by sensor module 110. For example, in initial response, alarm module 127 causes display of images from sensor module 110 on display 123; provides an audible, visible, and/or haptic alert signal to the user; and initiates a 5-, 10-, 15-second countdown timer. During the countdown period, the user is expected to silence the alarm by actuating a control button 129 on housing 121. If the control button is not actuated control module 124A initiates an additional alarm for a longer period of time than the first, and initiates a second countdown timer of 5, 10, or 15 seconds. In some embodiments, the control module also activates a haptic or audible alarm within the sensor module to further gain the attention of the user. If the second countdown timer expires, indicating that the user has not actuated the control button (an assumed indication of safety), then the control module automatically transmits an SOS signal, via the one or more of the transceivers in transceiver module 125, to security dispatcher system 130. In some embodiments, transceiver module 125 includes a Bluetooth-compliant transceiver for two-way communications with sensor module 110, in addition to one or more Wi-Fi-compliant and/or mobile telephone transceivers.

Also, in some embodiments, users may program the base module via one or more control buttons and/or a touchscreen version of display 123, to make a safety check in a certain amount of time, such as 10, 20, 30 minutes, one, two, or three hours, or at a designated time, such as 6:00 pm. The safety check entails automatically issuing a 30-second alarm based on the programmed time. If the control button is actuated to end the alarm, and no further action is taken, because the base module assumes that the user is safe. However, if the control button is not actuated to terminate the alarm prior to its predetermined length, a second 30-second alarm is initiated. If the second alarm is terminated using the control button then no further action is taken. However, if the second alarm is not terminated or the control button not actuated within a certain time frame, for example 15 seconds of the alarm ending, the base module assumes that the user is not safe, and issues an SOS signal via transceiver module 125 to security dispatcher system 130.

In some embodiments, base module 120 includes an accelerometer or tilt switch to automatically activate transmission of images from sensor module 110 to the base module in response to a user raising or back-and-forth shaking his or her wrist with the base module attached, enabling the user to view the images on the display whenever desired. Also, in some embodiments, alarms are provided at successively greater intensity and pulse rate the closer a detected object comes to the user. Also, in still other embodiments, the base module includes a microphone, and an image sensor and associated machine-executable instructions. The instructions enable automatic activation of the image sensor and recording of sound and images in response one or more predetermined gestures or in response to recognition of utterance of a word or phrase, such as "help" or "police." In some embodiments, the imaging sensor on the sensor module is also activated simultaneously, with images from both being transmitted to security dispatcher system 130.

Security dispatcher system 130 includes one or more transceivers 131 for receiving SOS data from one or more base modules 120, as well as one or more servers 132 for communicating SOS data to multiple law enforcement or security personnel, according to pre-established protocols based for example on user-preferences. In some embodiments, subsystem 130 includes a database 133. Database 133 includes data regarding the identity of the geocoded database of public and private security and health and safety agencies along with associated URL, email, and telephone numbers, enabling finding security options within a predetermined distance, for example, 5 miles of the location associated with the SOS. In some embodiments, database includes an associated and prioritized contact list of friends and family to be contacted. In some embodiments, an automated phone call or text (SMS) message is made to the user's mobile phone, requesting confirmation of the SOS, prior taking further action.

FIGS. 2A, 2B, and 2C shows an alternative version of wrist-mountable base module 120 as a base module 220. Base module 220 is similar and form and function to base module 120, with the exception that base module 220 includes an under-mounted pepper spray dispenser 290. FIG. 2A shows pepper spray dispenser 290 in a closed, and inoperative position, and FIG. 2B shows pepper spray dispenser 290 in an open, and operative slide-out right position, allowing the user to dispense pepper spray contained in a pressurized pepper spray cartridge 291 through a dispense nozzle 292 toward an attacker after being alerted of an approaching attacker. FIG. 2C shows that on the left side of the module, the side opposite the slide-out side, base module 220 includes a pepper-spray activation switch 293, which slides back and down along a slot 293A to cause dispensing of the pressurized pepper spray. Also shown in this view is an emergency button, which when activated automatically transmits an SOS signal, including GPS position data, to the security dispatch system.

Figure 3:
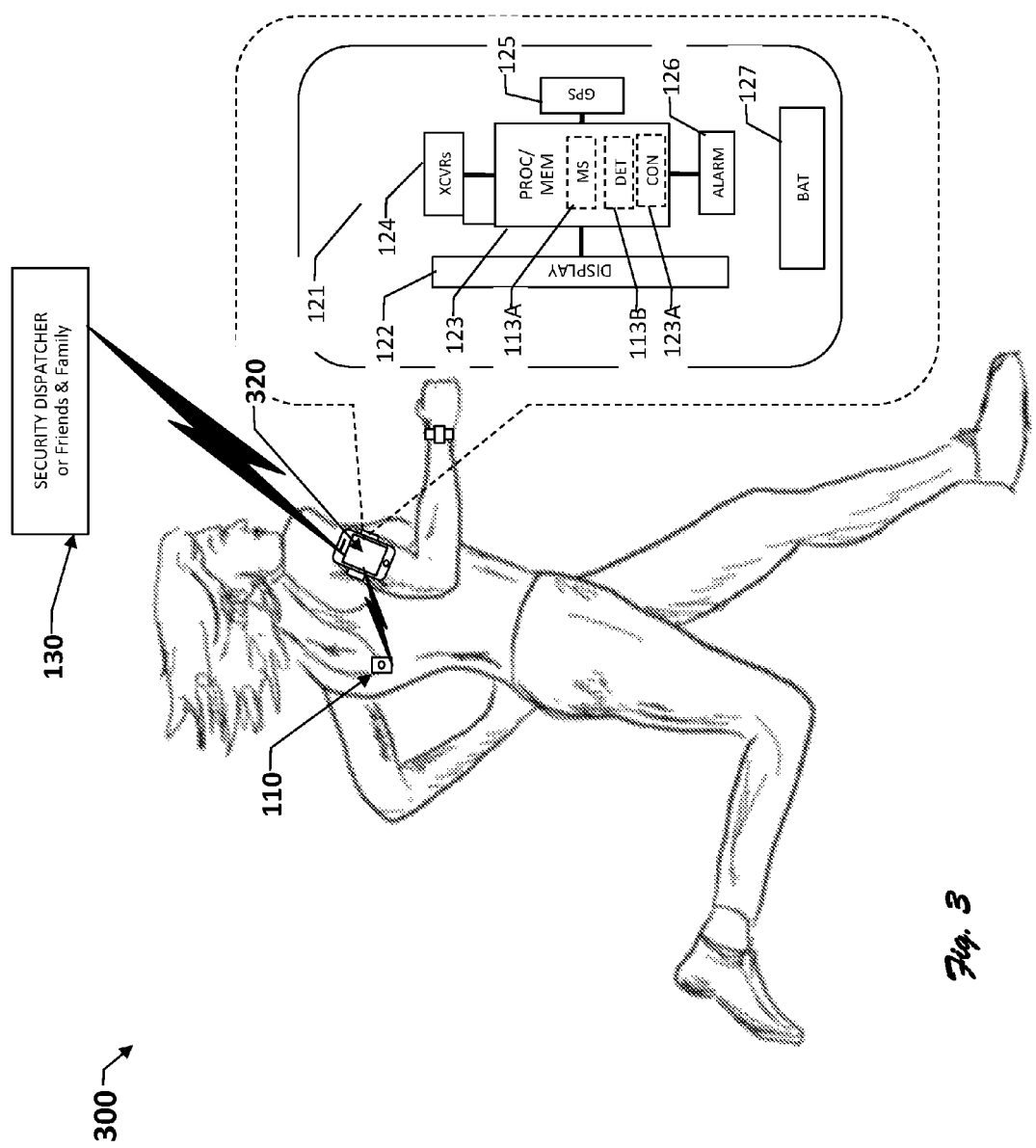
FIG. 3 is a block diagram of an alternative personal security system 300, corresponding to one or more embodiments of the present invention.

FIG. 3 shows an alternative wearable personal security system 300. System 300 is similar in form and function to system 100, with the exception that base module 120 is replaced with a base module 320. Base module 320 includes the features and functionality of base module 120 in a smartphone form-factor, which is mounted to the upper arm of a user via an armband.

Figure 4:
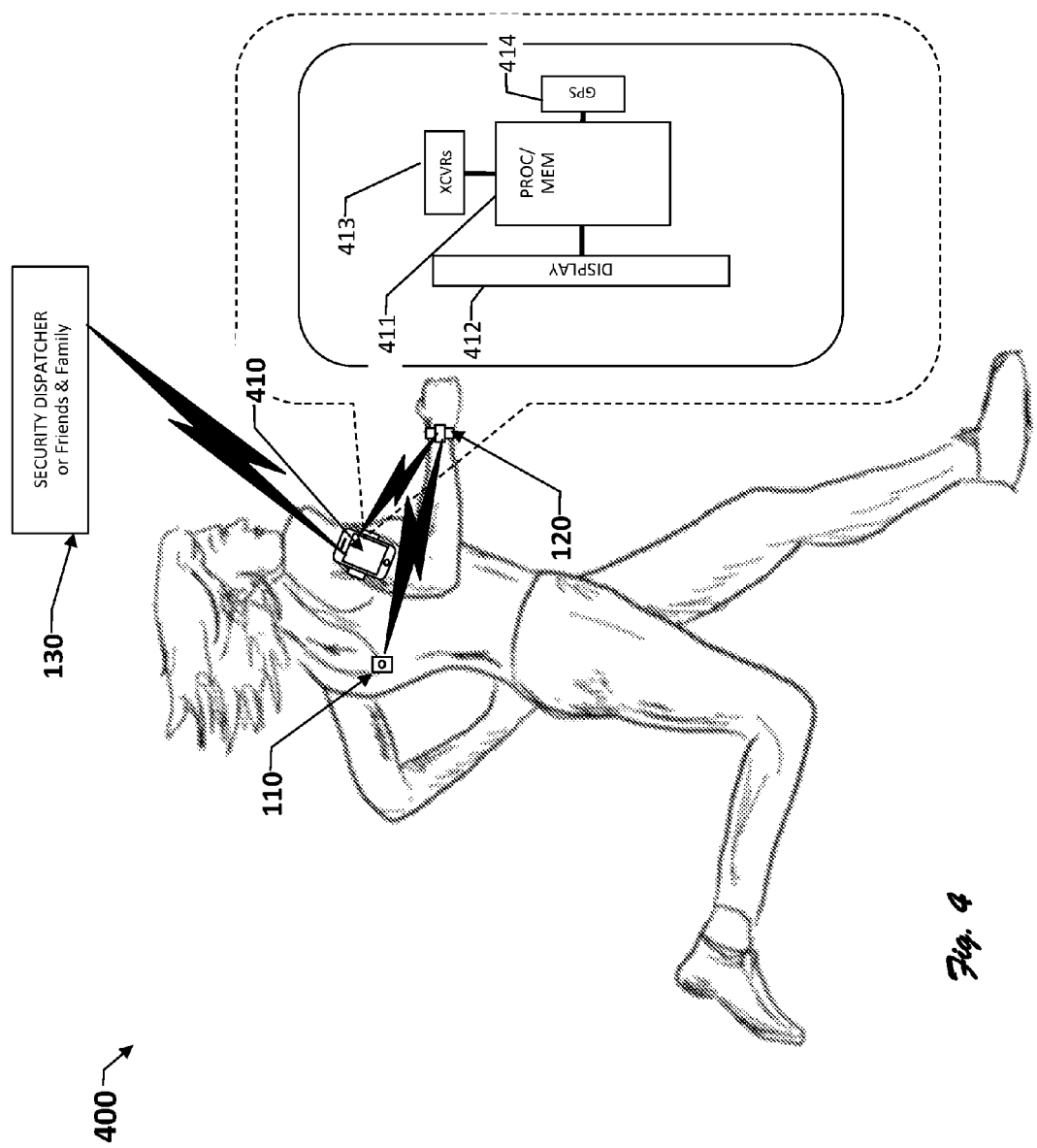
FIG. 4 is a block diagram of an alternative personal security system 400, corresponding to one or more embodiments of the present invention.

FIG. 4 shows an alternative personal security system 400. System 400 is similar in form and function to system 100, with the exception that the system 400 includes a smartphone 410 and that base module 120 communicates with security dispatcher 130 via smartphone 410, instead of directly. To this end, smartphone 410 includes, among other things, a processor-memory module 411, an electronic touch-screen display 412, transceivers 413, and a GPS module 414. Processor-memory module 411 includes an app (machine-readable instructions stored in memory) to facilitate communications between base module 120 and security dispatcher 130. Transceivers 413 include one or more mobile telephony radios and at least one Bluetooth-compliant transceiver paired with base module 120. In some embodiments, base module 120 omits one or more transceivers as well as its GPS module, to reduce size, cost, and complexity of the base module, instead relying on the native GPS and mobile telephony radios within smartphone 410.

Figure 5:
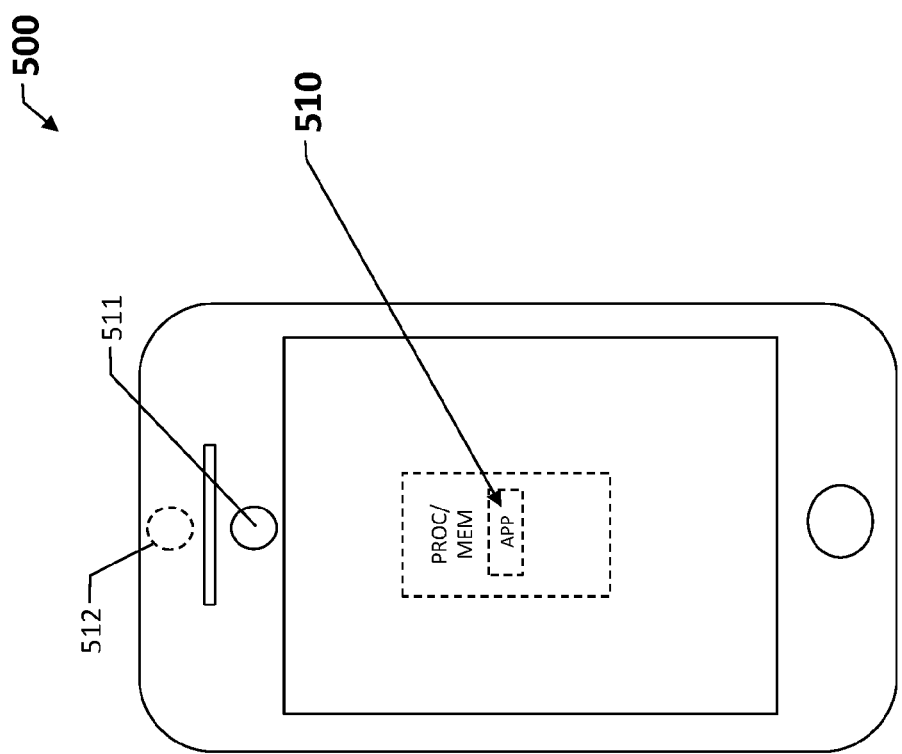
FIG. 5 is a block diagram of an alternative personal security system 500, corresponding to one or more embodiments of the present invention.

FIG. 5 shows another personal security system 500 in the form of a smartphone 500. Smartphone 500 includes, among other things, a native or after-market security app 510 which uses front 511 and/or back cameras 512 on the phone as security sensors when not in normal use. For example, a user may be using a non-camera function or app on the smartphone (for example phone, text, email, or browser or game, or video), and the security app, if active, will activate the front and/or back phone cameras (based on stored user preference information) and monitor the front and/or back camera signals, alerting the users to changes in front and/or back changes in imagery, such as an approaching object or person. In some embodiments, one or more of the cameras, imaging sensors, is infrared, and detection logic as described for other systems herein is included within app 510. In some embodiments, the alert may take the form of a tactile vibration, a sound, and/or a visible indicator, such as pop-up display of a small video window showing the real-time output of the front or back camera responsible for the alert condition. In some embodiments, the front or back camera is an infrared camera and app 510 includes motion filtering and/or detection instructions as described for system 100 and/or 300.

CONCLUSION

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments, for example those involving smartphones, tablets, computers, smart watches, may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments can be implemented as a computer-readable storage medium having computer readable code stored thereon for programming a computer (e.g., including a processor) to perform a method as described and claimed herein. Likewise, computer-readable storage medium can include a non-transitory machine readable storage device, having stored thereon a computer program (machine executable instructions) that include a plurality of code sections for performing operations, steps or actions as described herein.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Smartphone, smart watches, and other devices referred to herein my include one or more processing circuits and associated or operatively coupled non-transient memory for storing machine-readable and executable instructions as well as associated data for carrying out, supporting, or otherwise facilitating one or more of the functions or aspects of the functionality described herein.

The invention claimed is:

1. A personal security assembly for a user, the assembly comprising:
   one or more user-wearable sensors for sensing data about an object moving behind the user;
   processing circuitry associated with the one or more sensors for determining in response to the sensed data whether the object moving behind the user satisfies a threat condition;
   an alert signal generator, responsive to satisfaction of the threat condition, to generate a user perceptible alert signal; and
   user-motion filtering means for filtering user motion from an output of one or more of the sensors and inhibiting the processing circuitry from falsely determining satisfaction of the threat condition based on the filtered user motion.

2. The personal security assembly of claim 1, wherein the processing circuitry determines whether the object is moving closer to the user and wherein the threat condition is satisfied if the object is determined to be moving closer.

3. The personal security assembly of claim 1, further comprising:
   a first housing attached to a clothing clip, with the first housing at least partially enclosing one or more of the sensors and the processing circuitry; and
   a second housing attached to an arm- or wrist-band, with the second housing at least partially enclosing the alert signal generator.

4. The personal security assembly of claim 3, wherein the one or more sensors includes an imaging array.

5. The personal security assembly of claim 4, wherein the second housing at least partially encloses an electronic display that displays images of the imaging array in response to satisfaction of the threat condition.

6. The personal security assembly of claim 5, wherein the second housing at least partially encloses means for enabling a user to intentionally command display of images from the imaging array in response to the user making an arm-raising or hand-shaking gesture, wherein the means for enabling includes a tilt sensor or an accelerometer.

7. The personal security assembly of claim 3, wherein the one or more sensors includes an infrared imaging array and wherein the processing circuitry measures relative growth of a hot spot within two or more sequential images to determine if the threat condition is satisfied.

8. The personal security assembly of claim 3, wherein the one or more sensors include an ultrasonic range finder and an imaging array.

9. The personal security assembly of claim 6, further including means for activating the image array in response to a determination that the object is within a predetermined distance of the user.

10. The personal security assembly of claim 8, further including means for activating the ultrasonic range finder in response to a determination that the object is within a predetermined distance of the user.

11. The personal security assembly of claim 1, further comprising:
    a first housing attached to a clothing clip, with the first housing at least partially enclosing one or more of the sensors and a first wireless transceiver for communicating data from the sensors; and
    a second housing attached to an arm- or wrist-band, with the second housing at least partially enclosing the processing circuitry, the alert signal generator, and a second wireless transceiver.

12. The personal security assembly of claim 11 further comprising a defensive-chemical dispenser module mounted to the second housing.

13. A personal security assembly for a user, the assembly comprising:
    a first housing attached to a clothing clip, the first housing at least partially enclosing an imaging array and a first wireless transceiver configured to transmit image data from the imaging array;
    a second housing attached to an arm- or wrist-band, the second housing at least partially enclosing a second wireless transceiver, an electronic display, and an accelerometer, with the second wireless transceiver configured to communicate an imaging array activation signal to the imaging array via the first wireless transceiver and the electronic display configured to display image data from the imaging array, in response to the accelerometer detecting a manual user command initiated via one or more predetermined user hand or arm gestures.

14. The personal security assembly of claim 13, wherein the assembly further comprises:
    means, responsive to image data from the image array, for determining whether an imaged object within the image data is closing on the user and further responsive to a determination that the image object is closing to issue an alert signal;
    a haptic feedback module mounted on the arm- or wrist-band and responsive to the alert signal to provide a haptic alert signal to the user.

15. The personal security assembly of claim 13 further comprising a defensive-chemical dispenser module mounted to the second housing.

16. The personal security assembly of claim 15, wherein the defensive-chemical dispenser module is mounted to the underside of the second housing.

17. The assembly of claim 14, further comprising a third wireless transceiver configured to transmit an emergency message to a predetermined recipient, with the message including user-identification information and geo-location information for the user.

18. A method comprising:
    attaching a sensor module to a back of a user;
    automatically determining, based on output of the sensor module, whether a sensed object behind the user is closing or not closing on the user, wherein the automatic determination includes filtering out data indicative of user motion and inhibiting false determinations that the sensed object is closing or not closing based on the filtered out data; and
    alerting the user in response to a determination that the sensed object is closing.

19. The method of claim 18, wherein the sensor module outputs imaging data.

20. The method of claim 19, wherein automatically determining whether the sensed object behind the user is closing or not closing on the user, includes
    identifying in a first frame of the image data a first object region associated with the sensed object;
    identifying in a second frame of the image data a second object region associated with the sensed object;
    determining a parameter based on relative size of the first and second object regions; and
    comparing the determined parameter to a threshold to determine whether the sensed object is closing or not closing on the user.

21. The method of claim 20, wherein the image data is infrared image data.

22. The method of claim 19:
wherein the sensor module includes a ultrasonic transducer; and
wherein automatically determining whether the sensed object behind the user is closing or not closing on the user, includes:
using the ultrasonic transducer in determining first and second range measurements for the sensed object;
determining a parameter based on the first and second range measurements; and
comparing the determined parameter to a threshold to determine whether the sensed object is closing or not closing on the user.

23. The method of claim 18, wherein alerting the user in response to a determination that the sensed object is closing, includes transmitting an alert signal to a receiver unit in a smartphone or in a wristwatch.

24. The method of claim 23, wherein the sensor module includes an imaging array; and wherein the method further comprises transmitting images from the image array to a display device mounted on the wrist of the user or mounted in a mobile telephone device in response to a user command, after alerting the user.

* * * * *